(No Model.)
C. A. JŎHANSSON.
DEVICE FOR TAKING UP END PRESSURE OF ROTATING SHAFTS.
No. 335,757. Patented Feb. 9, 1886.

Witnesses
Chas H Smith
J Staily
Inventor
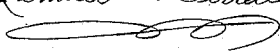
Carl A. Johansson
per Lemuel W. Serrell
atty

UNITED STATES PATENT OFFICE.

CARL AUGUST JŌHANSSON, OF STOCKHOLM, SWEDEN, ASSIGNOR TO THE COMPANY AKTIEBOLAGET SEPARATOR, OF SAME PLACE.

DEVICE FOR TAKING UP END-PRESSURE OF ROTATING SHAFTS.

SPECIFICATION forming part of Letters Patent No. 335,757, dated February 9, 1886.

Application filed August 31, 1885. Serial No. 175,703. (No model.)

*To all whom it may concern:*

Be it known that I, CARL AUGUST JŌHANSSON, a subject of the King of Sweden and Norway, and a resident of Stockholm, Sweden, have invented a new and useful Method of Taking Up the End-Pressure of Rotating Shafts, of which the following is a specification.

This invention refers to a method of taking up the end-pressure of rotating shafts with the view of diminishing the frictional resistance and of preventing the shaft or the pivot from running hot and welding fast. For this purpose the end of the shaft is made to abut against or stand upon either one disk movable around its center, which disk, during the rotation of the shaft by the friction between the surfaces touching each other, is caused to rotate, or upon two such disks placed beside each other, but independent of each other, which, during the rotation of the shaft, are caused to rotate in opposite directions. In order to make the frictional resistance as small as possible, the whole disk ought in the first case to be placed at the side of the center of the shaft, and in the latter case the center of the shaft should be situated between the disks. The center of the shaft may, however, be placed a little in upon the disk or upon one of the disks, and there will nevertheless be a guarantee for not getting fast, even though the frictional resistance then augment a little; but the center of the shaft should never stand quite upon or very near the midst of the disk.

Figure 1:
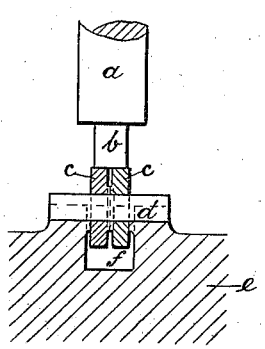
Figure 2:
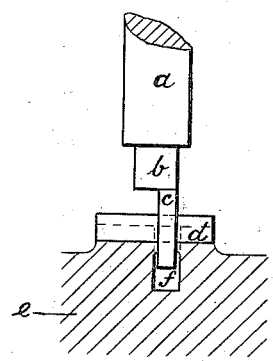
Figure 3:
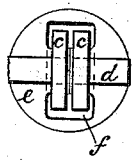
Figure 4:
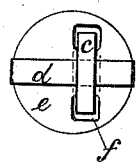

In the annexed drawings, Figures 1 and 3 show, in longitudinal section and in plan, an example of an arrangement with two supporting-disks; and Figs. 2 and 4, in longitudinal section and in plan, an example of an arrangement with one disk.

In Figs. 1 and 3, $a$ is a part of the rotating shaft, which is kept in position by any guiding-bearing. (Not shown in the drawings.) The shaft is in this case supposed to be provided with a steel pivot, $b$.

$c\ c$ are two disks running loose on the shaft $d$, mounted on some fixed support $e$. This support $e$ is provided with a recess, $f$, wherein the lower parts of the disk are running and by the walls of which they are guided. Into this recess some lubricant may, if desired, be introduced, which, during the rapid rotation of the disks, is drawn up and lubricates the end surface of the pivot and likewise the surface of contact between the disks and their shaft; but in most cases no such lubrication is wanted.

In Figs. 2 and 4 there is only one disk, $c$, situated at the side of the center of the pivot $b$, so that it is turned around by the pivot with very small resistance.

When the pressure of the shaft is received by only one disk, the latter may either run loose on its shaft $d$, or be fixed on the shaft $d$, which in this case is itself movable in the support $e$.

This method of taking up the end-pressure may be used as well for upright as for horizontal or inclined shafts.

I claim as my invention—

1. The combination, with a rotative shaft having an endwise weight or pressure, of one or more disks and a supporting-shaft for the same, the end of the rotative shaft resting against the edge of such disk or disks, substantially as specified.

2. The combination of a rotating shaft and two disks running loose on a shaft, and against which the end of the rotating shaft rests, substantially as and for the purposes set forth.

3. The combination of a rotating shaft and a disk running loose on a shaft, and against which the rotating shaft rests, substantially as and for the purposes set forth.

4. The combination of a rotating shaft and a disk fixed on a movable shaft, and against which the rotating shaft rests, substantially as and for the purposes set forth.

5. The combination of a rotating shaft and one or two movable disks against which the end of the shaft is resting, and a receptacle for the lubricant, which receptacle partially surrounds the movable disks, substantially as and for the purposes set forth.

In testimony that I claim the foregoing as my invention I have signed my name, in presence of two witnesses, this 8th day of August, 1885.

CARL AUGUST JŌHANSSON.

Witnesses:
    FREDRIK L. ENQUIST,
    WALDEMAR BOMAN,
        *Both of Stockholm.*